United States Patent [19]

Hulek et al.

[11] Patent Number: 4,978,107

[45] Date of Patent: Dec. 18, 1990

[54] APPARATUS FOR PRODUCING FOAMED BLAST FURNACE SLAG

[75] Inventors: Anton Hulek, Goglerfeldgasse 15, A-4040 Linz; Werner Koller; Kurt Auer, both of Linz, all of Austria

[73] Assignees: Voest-Alpine Industrieanlagenbau Gesellschaft m.b.H.; Anton Hulek, both of Linz, Austria; a part interest

[21] Appl. No.: 422,583

[22] Filed: Oct. 17, 1989

[30] Foreign Application Priority Data

Oct. 20, 1988 [AT] Austria .................................. 2588/88

[51] Int. Cl.⁵ ............................................... C21B 3/06
[52] U.S. Cl. ................................................... 266/201
[58] Field of Search ............................. 266/201; 75/24

[56] References Cited

U.S. PATENT DOCUMENTS 2,286,078  6/1942  Hatchard ............................ 266/201
4,420,304 12/1983  Nakatani ............................ 266/201

Primary Examiner—Peter D. Rosenberg
Attorney, Agent, or Firm—Collard, Roe & Galgano

[57] ABSTRACT

To permit a continuous production of foamed blast furnace slag, a revolving conveyor is provided, which is continuously supplied with a stream of slag from a slag feeder in a trough which comprises a bottom and side walls rising from the bottom. Adjacent to the slag feeder, stationary tubular lances extend in said trough closely above the bottom in the direction of conveyance and are formed in a predetermined length portion with radial outlet orifices for a discharge of water into said trough.

6 Claims, 2 Drawing Sheets

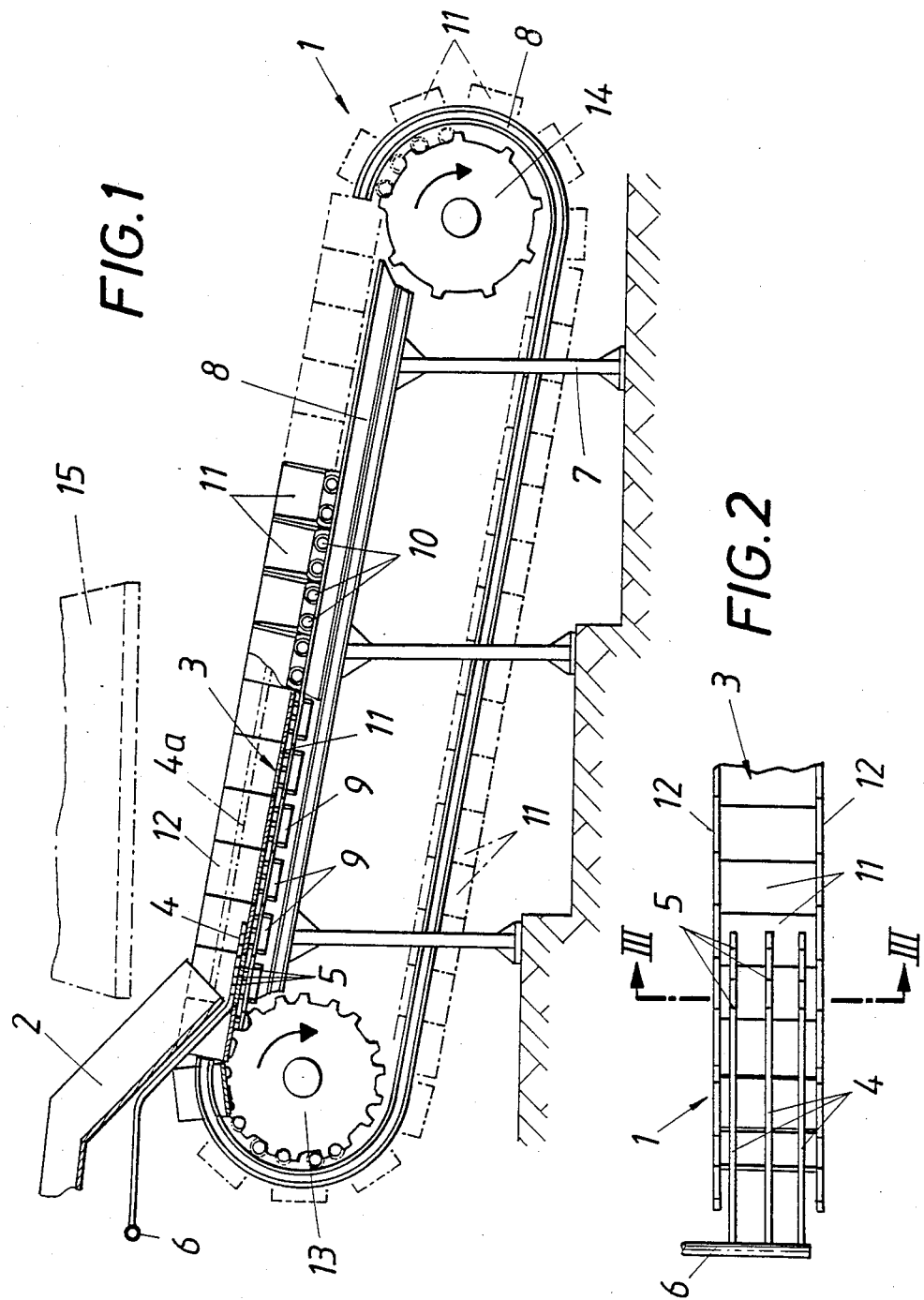

APPARATUS FOR PRODUCING FOAMED BLAST FURNACE SLAG

BACKGROUND OF THE INVENTION

1. Field of the Invention

This invention relates to an apparatus for producing foamed blast furnace slag comprising a revolving conveyor including a bottom and side walls rising from the bottom, which conveyor serves to receive molten slag from a slag feeder, and stationary water-dispensing means adjacent to the slag feeder.

2. Description of the Prior Art

In the production of foamed blast furnace slag, water is injected into the molten slag so that the slag is foamed and cooled. For that purpose it is usual to pour the slag into a tub, which has a bottom that is provided with nozzles, through which the water required to foam and cool the molten slag is discharged under pressure. When the foamed slag has solidified, it is removed from the tub. An important disadvantage of that production of foamed blast furnace slag resides in the fact that the foaming of the slag will result in a formation of sulfur dioxide and hydrogen sulfide at high rates for limited times as by-products, which cannot be removed in a controlled manner. Besides, it is hardly possible to control the foaming operation because a certain amount of water must be supplied first and the slag will foam spontaneously after the water has been supplied.

In an endeavor to permit a continuous processing of the slag it is known from U.S. Pat. No. 2,286,078 to apply the liquid slag to a belt conveyor, which constitutes a trough that comprises a bottom and side walls. Before the slag is applied to the belt, the latter is supplied with water so that the molten slag is caused to foam as the slag poured onto a film or bath of water. Because the foaming is not controlled, that known apparatus is mainly intended to produce granule but is less suitable to produce foamed blast furnace slag, which differs from granules in that it is required to have even at its surface a pore distribution which is as uniform as possible.

Summary of the Invention

For this reason it is an object of the invention to avoid the disadvantages outline hereinbefore and to provide for the production of foamed blast furnace slag an apparatus which is of the kind described first hereinbefore and which permits a controlled removal of sulfur dioxide and hydrogen sulfide and permits also an optimum control of the foaming of the molten slag.

That object is accomplished in accordance with the invention in that the water-dispensing means comprise at least one tubular lance, which adjacent to the slag feeder extends above the bottom of the conveyor between the side walls thereof and in the direction of travel of the conveyor extends into the layer of molten slag formed on the revolving conveyor and is formed with radial water outlet orifices in a length portion which extends in the slag layer.

Because the water is supplied through at least one tubular lance, which extends in the slag layer above the bottom of the revolving conveyor, the water can be introduced into the slag layer in a controlled manner at the rate at which said water is required to foam the slag. This will ensure a uniform foaming of the slag layer on the revolving conveyor regardless of the irregularities which will inevitably occur as the slag is poured onto the revolving conveyor. As the foaming will proceed continuously and can be optimized by a control of the speed of travel of the revolving conveyor and of the water supply, the foaming will result in a continuous formation of sulfur dioxide and hydrogen sulfide at relatively low, uniform rates so that said by-products can simply be sucked off in the locally limited region in which they are formed and will not pollute the environment.

The water which has been discharged from the tubular lance will form around the lance an annulus of steam and the water flowing through the lance will cool the tubular lance. As a result, the loading of the tubular lance with heat from the molten slag will remain within a permissible range. Besides, the slag will slide along the tubular lance and will not stick to it so that such tubular lances can actually be used for a continuous supply of water in the stationary region in which the slag is applied to the conveyor. It will be understood that the number of tubular lances and their distribution over the width of the revolving conveyor will depend on the conditions encountered in each case. Care must only be taken to ensure that the tubular lances do not cover the bottom of the conveyor in such a manner that the conveyance of the slag will be adversely affected.

To permit an adaptation of the water supply to the water demand of the slag at various locations, which water demand will depend on the required foaming operation and on the desire cooling, a further feature resides in that a plurality of tubular lances are provided, which in that length portion which extends into the slag layer are formed with water outlet openings in different distributions so that a suitable distribution of the water supply will be ensured not only over the cross-section of the slag layer but also in the longitudinal direction of the conveyor at least in the foaming region.

The revolving conveyor must be adapted to hold and convey the stream of slag and for this reason must comprise a trough including a bottom and side walls rising from said bottom. In other respects the design of the revolving conveyor may be freely chosen and that conveyor may consist, e.g., of a revolving wheel, a slag conveyor which is trained around reversing pulleys, a revolving endless chain, which is provided with buckets guided along a track. If the revolving conveyor rises in the direction of travel adjacent to the slag feeder, as will hardly be avoided if the conveyor consists of a revolving wheel owing to the required length of conveyance, a reliable conveyance of the slag must be ensured by the provision of transverse partitions, which must be formed with slots through which the tubular lances can extend. But such transverse partitions will adversely affect the uniform foaming of the slag stream because the slag will rise to a higher level adjacent to each partition. Such transverse partitions will also render more difficult a splashfree pouring of the slag onto the revolving conveyor. For this reason it will be preferable to provide a revolving conveyor having a path of conveyance which slopes downwardly in the direction of conveyance so that transverse partitions will not be required.

When the foamed blast furnace slag has sufficiently been cooled, it can be removed from the delivery end of the revolving conveyor and can be subjected to further processing. The solidification of the foamed slag will depend on its cooling along the path of conveyance. In order to reduce the required length of the path of conveyance, additional cooling means must be provided. For this reason, the tubular lances may comprise one or more tubular lances extending adjacent to the bottom of the revolving conveyor and additional stationary tubular lances, which extend adjacent to the side walls of the revolving conveyor from the slag feeder through and beyond the foaming region and beyond the foaming region are formed with radial water outlet orifices. In that case, additional cooling water can be supplied to the stream of foamed slag for an accelerated cooling and solidification. As a result, the path of conveyance may be shorter than would otherwise be required and the heat loading of the side walls of the revolving conveyor will be reduced.

Because the slag stream supplied to the revolving conveyor is foamed continuously, building blocks made of foamed blast furnace slag can be produced in a simple manner if a covering for limiting the height to which the slag can foam is provided between the side walls of the trough of the revolving conveyor downstream of the slag feeder. In that case a continuous strand consisting of foamed blast furnace slag and having a predetermined cross-sectioned will be delivered by the revolving conveyor at its delivery end and said strand can be divided into length portions to form building blocks. That covering may be stationary or may be constituted by an endless belt.

BRIEF DESCRIPTION OF THE DRAWING

FIG. 1 is a diagrammatic side elevation which is partly broken away and shows an apparatus in accordance with the invention for the production of foamed blast furnace slag.

FIG. 2 is a simplified top plan view showing that portion of said conveyor which is adjacent to the slag feeder.

DETAILED DESCRIPTION OF THE PREFERRED EMBODIMENT

Figure 3:
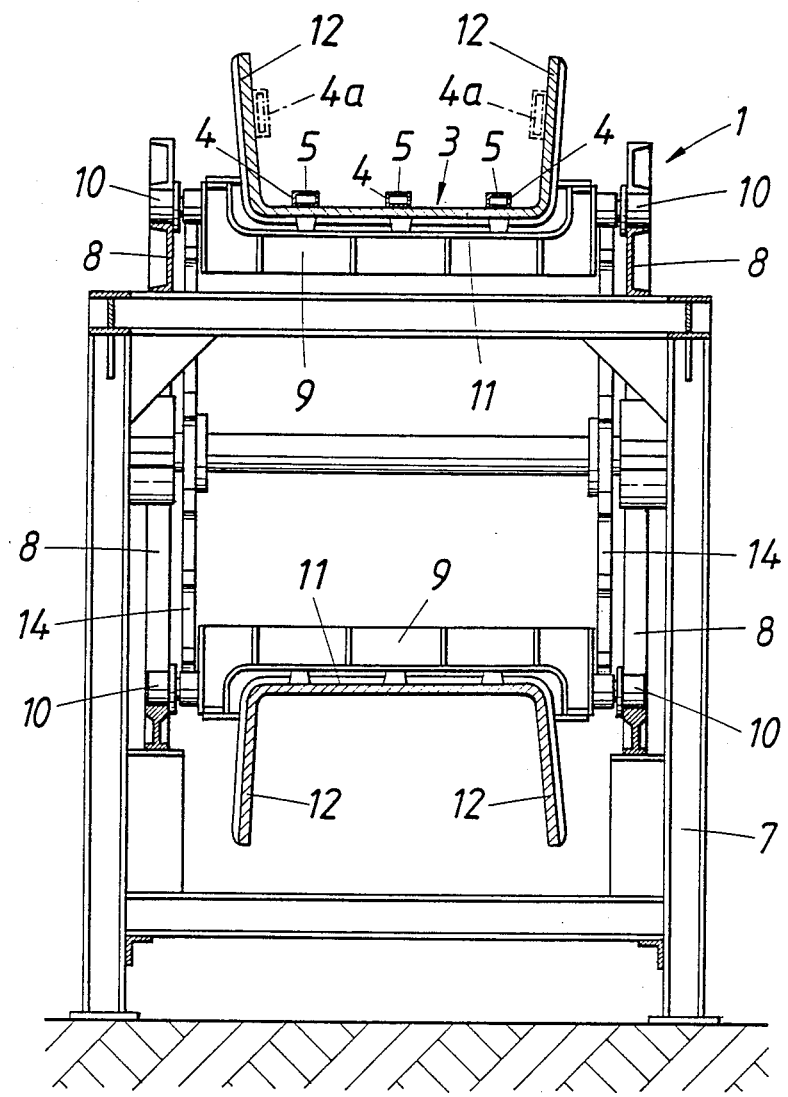
FIG. 3 is a transverse sectional view taken on line III—III in FIG. 2.

The invention will now be explained more in detail with reference to an embodiment shown in the drawing.

The illustrated apparatus for producing foamed blast furnace slag comprises a revolving conveyor 1, which receives a continuous stream of slag from a slag feeder 2. On the downstream side of the slag feeder 2, the conveyor 1 is provided with tubular lances 4, which extend above the bottom 3 of the conveyor in the direction of conveyance and are connected to a common pressure water line 6 and in a predetermined length portion are formed with radial water outlet orifices 5.

The revolving conveyor 1 comprises a frame 7, in which a track 8 is mounted, which serves to guide discrete revolving elements 9, which are moved along the track 8 by means of rollers 10 guided by the track 8. Each revolving element 9 carries a trough section 11, which is U-shaped in cross-section and comprises legs and a web, which joins the legs. The legs constitute the side walls 12 of a revolving trough and the webs constitute the bottom 3 of said trough. The revolving elements 9 are driven by means of a reversing pulley 13, which is provided on the upstream side of the slag feeder 2 and adjacent thereto and applies pressure to those revolving elements 9 which engage the upper course of the track 8 so that the trough sections 11 are forced together along the track 8 at adjacent ends and together constitute a continuous trough for holding the stream of slag discharged by the slag feeder 2. At the delivery end of the revolving conveyor 1, the revolving elements 9 are trained around a reversing pulley 14, which cooperates with the track 8.

Water under pressure is discharged through the radial outlet orifices 5 of the tubular lances 4 into the molten slag which has continuously been supplied by the slag feeder 2 between the side walls 12 of the revolving trough and that water causes the slag to foam as it is conveyed. Because the slag is conveyed continuously, the foaming will be continuous too and will result in a formation of sulfur dioxide and hydrogen sulfide at relatively low, uniform rates so that said by-products can entirely be sucked off together with the resulting steam by means of an offtake hood 15, which is indicated in phantom. As a result, a pollution of the environment by said by-products will reliably be avoided.

The slag which has been foamed and has sufficiently been cooled as it was conveyed can then be delivered at the delivery end of the conveyor 1 and can be subjected to further processing. The foaming operation can be controlled in a simple manner by a control of the speed of conveyance of the conveyor 1 and of the water supply rate in adaptation to the conditions encountered.

If the foamed slag has not been sufficiently cooled and solidified as it reaches the delivery end of the conveyor 1, the foamed slag may be additionally cooled downstream of the foaming length portion of the revolving trough. For that purpose, the tubular lances which are associated with the conveyor 1 comprise the tubular lances 4 which extend adjacent to the bottom 3 of the revolving trough and additional tubular lances 4a, which extend adjacent to the side walls 12 from the slag feeder 2 through and beyond the foaming length portion of the revolving trough and may extend as far as to the delivery end of the conveyor 1 and on the downstream side of the foaming length portion of the revolving trough are provided over their length with water outlet orifices in such a distribution that the water demand will be met. Because the tubular lances 4 and 4a are cooled by the water flowing through such lances and because an annulus of steam is formed around each of said tubular lances, the loading of the tubular lances with heat from the molten slag will be kept within permissible limits. The formation of said annulus of steam around each of the tubular lances 4 and 4a may be promoted in that each of said tubular lances 4 and 4a is formed with radial water outlet orifices 5 which are spaced apart peripherally and along said tubular lance.

We claim:

1. In an apparatus for producing foamed blast furnace slag, comprising
   a slag feeder for discharging molten slag,
   a conveyor comprising a revolving trough adapted to receive said molten slag from said slag feeder and having adjacent to said slag feeder a bottom and side walls rising from said bottom,
   said conveyor being operable to move said trough in a predetermined direction adjacent to said slag feeder,
   said trough comprising downstream of said slag feeder an initial foaming portion adapted to hold a layer of said molten slag supported on said bottom, and
   stationary water-dispensing means provided adjacent to said slag feeder and operable to supply water into said trough,
   the improvement comprising tubular lance means constituting said water-dispensing means and extending into said foaming portion of said trough, the water-dispensing tubular lance means extending into said layer of molten slag and defining radial water outlet orifices dispensing water into the molten slag layer for foaming the molten slag.

2. The improvement set forth in claim 1, wherein said tubular lance means comprises at least one tubular lance extending in said foaming portion of said trough adjacent to said bottom of said trough.

3. The improvement set forth in claim 1, wherein
said tubular lance means comprises a plurality of laterally spaced apart tubular lances, each of which extends in said foaming portion of said trough slag, and
said tubular lances defining radial water outlet orifices in different distributions.

4. The improvement set forth in claim 1, wherein a covering for limiting the height in which said slag is adapted to foam in said trough is disposed over said initial foaming portion.

5. The improvement set forth in claim 1, wherein said radial water outlet orifices are spaced apart peripherally and in said predetermined direction.

6. The improvement set forth in claim 1, wherein
said tubular lance means comprises a plurality of laterally spaced apart tubular lances, at least one of the tubular lances extending adjacent said bottom of said trough, the radial water outlet orifices thereof being arranged to dispense water into the molten slag layer in the initial foaming portion, and additional tubular lances extending adjacent said side walls and above the bottom tubular lance or lances, the radial water outlet orifices of the additional tubular lance being arranged to dispense water downstream of the initial foaming portion.

* * * * *